(12) United States Patent
Hosangadi et al.

(10) Patent No.: US 11,586,791 B1
(45) Date of Patent: Feb. 21, 2023

(54) VISUALIZATION OF DATA BUSES IN CIRCUIT DESIGNS

(71) Applicant: Xilinx, Inc., San Jose, CA (US)

(72) Inventors: Anup Hosangadi, Bengaluru (IN); Aman Gayasen, Hyderabad (IN); Srinivasan Dasasathyan, Secunderabad (IN); Padmini Gopalakrishnan, Hyderabad (IN)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 17/480,389

(22) Filed: Sep. 21, 2021

(51) Int. Cl.
*G06F 30/31* (2020.01)
*G06F 30/394* (2020.01)

(52) U.S. Cl.
CPC ............ *G06F 30/31* (2020.01); *G06F 30/394* (2020.01)

(58) Field of Classification Search
CPC ....................................... G06F 30/31
USPC .......................................................... 716/139
See application file for complete search history.

(56) References Cited

U.S. PATENT DOCUMENTS 8,205,183 B1 * 6/2012 Goh ........................ G06F 30/30
716/139

\* cited by examiner

*Primary Examiner* — Eric D Lee
(74) *Attorney, Agent, or Firm* — Crawford Maunu PLLC

(57) ABSTRACT

Approaches for visualizing data buses in a circuit design include determining ones of the data buses that satisfy selection criteria. For each element connected to a data bus of the ones of the data buses, a method and system determine whether the element is of interest or the element is not of interest. A graphical representation of the ones of the data buses and each element of interest is generated, and data buses of the circuit design determined to not satisfy the selection criteria and elements not of interest are excluded from the graphical representation. The graphical representation is displayed on a display device.

20 Claims, 6 Drawing Sheets

VISUALIZATION OF DATA BUSES IN CIRCUIT DESIGNS

TECHNICAL FIELD

The disclosure generally relates to graphically displaying data buses present in a circuit design.

BACKGROUND

Register Transfer Level (RTL) languages, such as Verilog and VHDL, continue to be popular for describing circuit designs. The implementation flow for realizing a circuit from a circuit design includes processes for synthesizing, simulating, and formally verifying the circuit design. At various stages of the implementation flow, a designer will typically seek to analyze the circuit design for purposes of debugging and achieving performance objectives. However, the increasing complexity and size of circuit designs has made the analysis of circuit designs difficult.

SUMMARY

A disclosed method includes determining by a computer processor, ones of data buses that satisfy selection criteria in a circuit design having a plurality of data buses that connect elements of the circuit design. The method determines, for each element connected to a data bus of the ones of the data buses, whether the element is of interest or the element is not of interest. The method includes generating a graphical representation of the ones of the data buses and each element of interest and excluding from the graphical representation, data buses of the circuit design determined to not satisfy the selection criteria and elements not of interest. The method includes displaying the graphical representation on a display device.

A disclosed system includes one or more computer processors and a memory arrangement configured with instructions that when executed by the one or more computer processors cause the one or more computer processors to perform operations for visualizing data buses of a circuit design. The operations include determining ones of the data buses that satisfy selection criteria and determining for each element connected to a data bus of the ones of the data buses, whether the element is of interest or the element is not of interest. The operations further include generating a graphical representation of the ones of the data buses and each element of interest and excluding from the graphical representation, data buses of the circuit design determined to not satisfy the selection criteria and elements not of interest. The system displays the graphical representation on a display device.

Other features will be recognized from consideration of the Detailed Description and Claims, which follow.

BRIEF DESCRIPTION OF THE DRAWINGS

Various aspects and features of the methods and systems will become apparent upon review of the following detailed description and upon reference to the drawings in which.

DETAILED DESCRIPTION

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

Designs involving field programmable gate arrays (FPGAs) are often used in applications to accelerate tasks directed by a CPU, as certain tasks can be performed much faster in hardware than by a CPU. The offloading of tasks from a CPU to an FPGA-implemented circuit is often referred to as "hardware acceleration." Hardware acceleration of tasks is characterized by substantial quantities of data flowing to/from and within the FPGA and substantial numbers of computations on that data. Performance bottlenecks can often be attributed to the data movement and computation. However, most schematics provide a true representation of all the components of a circuit design and present too many components for a designer to efficiently analyze the data flow.

The disclosed methods and systems identify those data buses in a circuit design that may be of interest to a designer and generate a graphical depiction of the data flow of only those data buses through different hierarchies and through certain points of interest such as block memories and compute elements. Components, signals, and data buses that are not of interest are excluded from the generated graphical depiction, allowing the designer to focus on impactful data flows. A feature that supports interactive display of portions of the data flow is also disclosed.

The methods and systems can be beneficial in a variety of ways in the implementation flow of a circuit design. The methods and systems can help the designer to better visualize how the data buses are connected in a design. The extraction of hierarchical design elements can also provide a concise block diagram of the entire design to a person viewing the design for the first time.

The data flow view provided by the methods and systems can be used in conjunction with timing analysis tools to arrive at better constraints for a design. For example, the data flow view can help the designer to budget the pipeline stages for critical data paths in the design. The data flow view can also provide a better starting point than would a schematic view to establish at an initial floorplan of the design.

The data flow view provided by the methods and systems provides a concise view of how macro blocks, such as block RAMs and digital signal processors (DSPs), are connected.

The designer can use the connectivity presented in the data flow view to determine physical constraints for locations of the macro blocks. Clustering algorithms in synthesis can also use the data flow view to identify closely connected clusters of instances in the design.

The data flow view provided by the methods and systems can also aid Automated Design Analysis (ADA) tools. ADA tools typically work on either the synthesized netlist or an original data flow graph of the design. The data flow view provided by disclosed methods and systems can enable the ADA tools to work on larger graphs to produce suggestions at a higher level of hierarchy and on wider points in the design.

Figure 1:
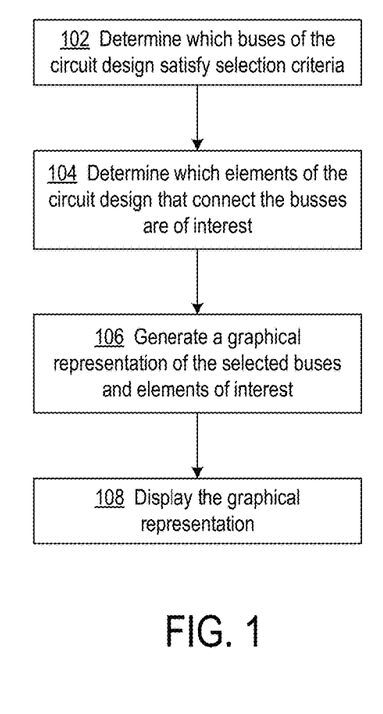
FIG. 1 shows a flowchart of a general process for displaying data buses of a circuit design.
Figure 3:
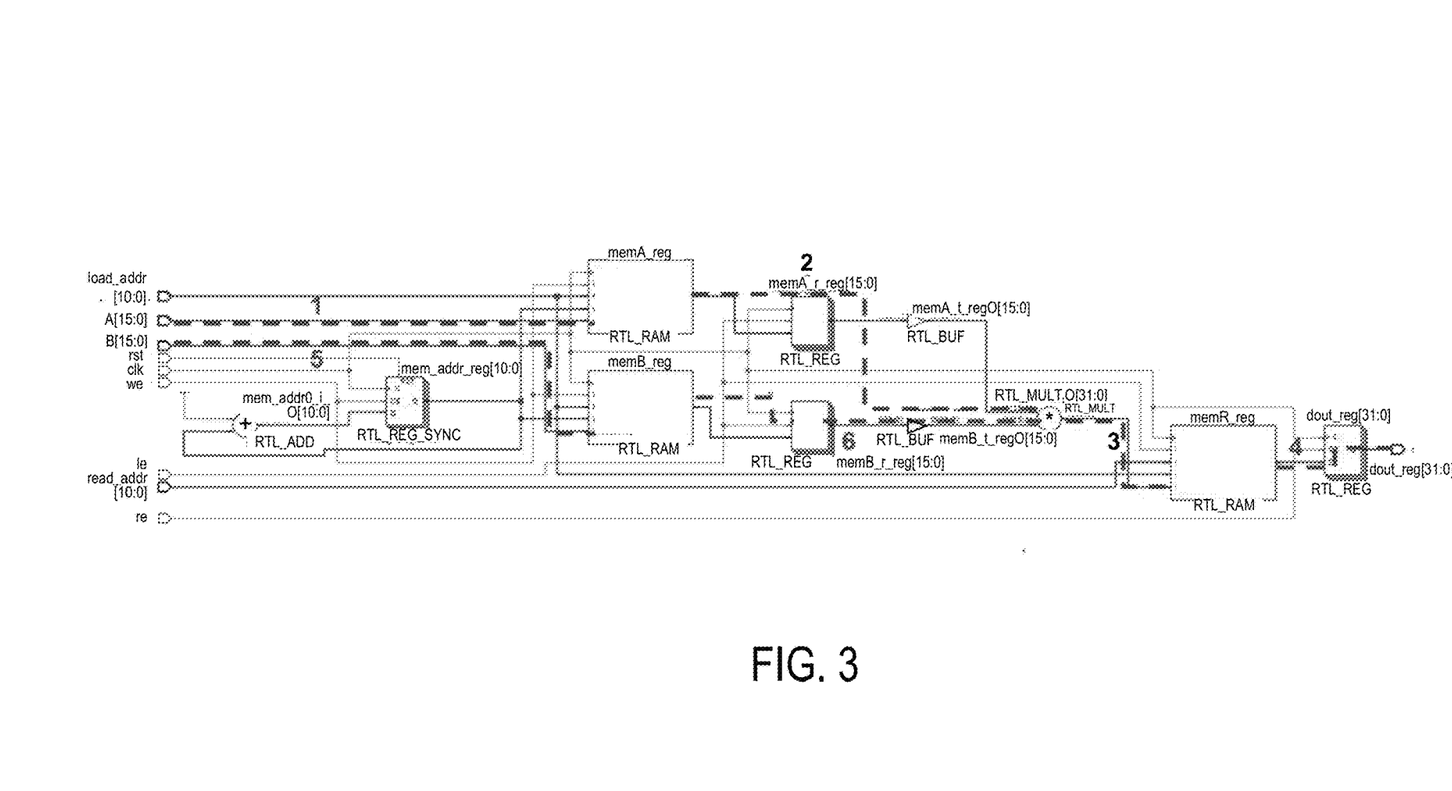
FIG. 3 shows a schematic view of a portion of an exemplary circuit design.
Figure 4:
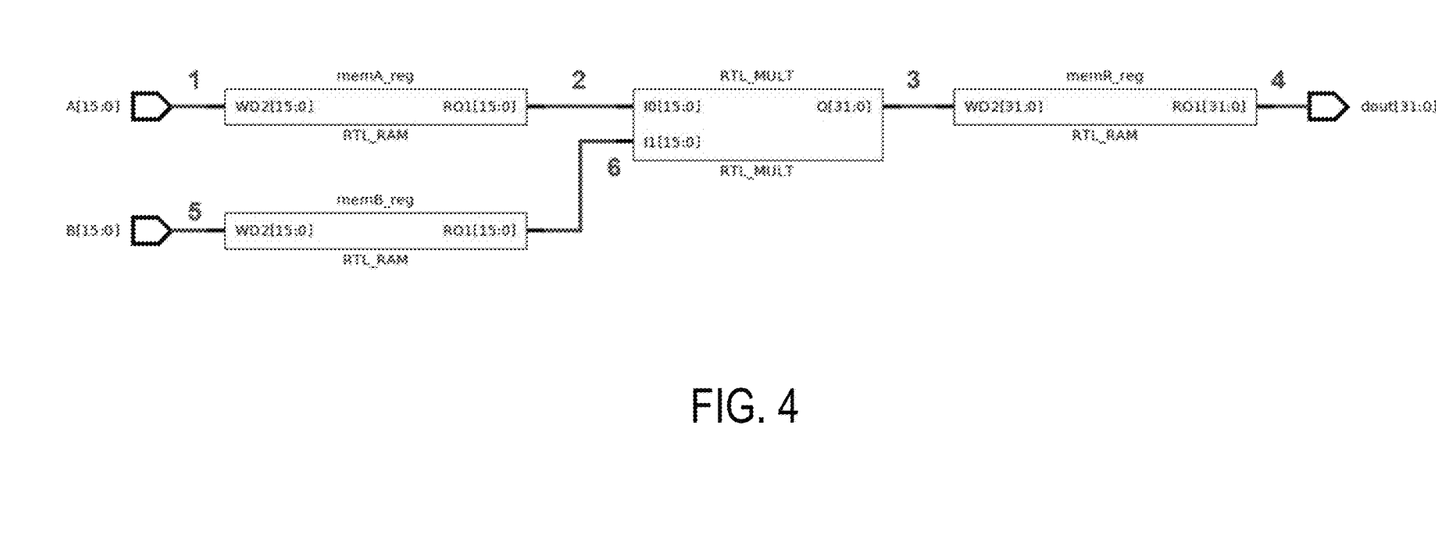
FIG. 4 shows an exemplary rendering of the graphical representation generated by the tracking process in tracing paths in the example of FIG. 3.

FIG. 1 shows a flowchart of a general process for displaying data buses of a circuit design. Note that as an example, FIG. 3 shows a detailed schematic of a portion of a circuit design, and FIG. 4 shows the data flow view generated according to the disclosed methods and systems. FIGS. 3 and 4 are described in more detail below.

At block 102, a design tool determines which data buses of a circuit design satisfy certain selection criteria. The circuit design can be a specification in a register transfer language, for example. The selection criteria can specify a minimum bus bit-width, such that buses having bit-widths greater than or equal to minimum bus bit-width are determined to satisfy the selection criteria. Other examples of bus selection criteria can be buses that pass through elements of interest, such as RAM blocks or DSP blocks. The design tool tracks which buses satisfy the selection criteria so that only those buses are presented in the resulting data flow view. Buses that do not satisfy the selection criteria are not tracked and not displayed in the resulting data flow view. "Criteria" as used herein also refers to the singular, criterion.

At block 104 the design tool determines which circuit elements are of interest for the data flow view and are connected to the data buses that satisfy the selection criteria. Typical elements that are of interest can include instances of hierarchical blocks and macro blocks. The design tool tracks which elements are of interest so that only those elements are presented in the resulting data flow view. Elements that are not of interest are not tracked and not displayed in the resulting data flow view.

The design tool can be programmed with identifiers of elements that are of interest by default. The design tool can also, or alternatively, use element identifiers that have been interactively input by a designer to determine the elements that are of interest.

At block 106, the design tool generates a graphical representation of the data buses in the circuit design determined to satisfy the selection criteria and the elements determined to be of interest. Excluded from the graphical representation are the data buses determined to not satisfy the selection criteria and elements not of interest.

The graphical representation includes blocks that represent the elements of interest, and for each data bus, a line that connects an output port of a source element to an input port of a destination element. The blocks and ports can retain the names from the source description, and bit-widths can be specified on the input and output ports on the blocks.

The design tool can display the graphical representation on a display device at block 108. The display device can be a monitor of a computer system on which the illustrated information is presented.

Two approaches are disclosed for tracking buses and elements of interest in a circuit design. The first approach is referred to as "top-down" bus tracking, and the second approach is referred to as "edge-based" bus tracking. Top-down bus tracking traces buses beginning at primary inputs, through connected elements, and ending at primary outputs. Edge-based tracking traces buses beginning with individual buses and adding qualifying buses and elements to graphical representation.

Figure 2:
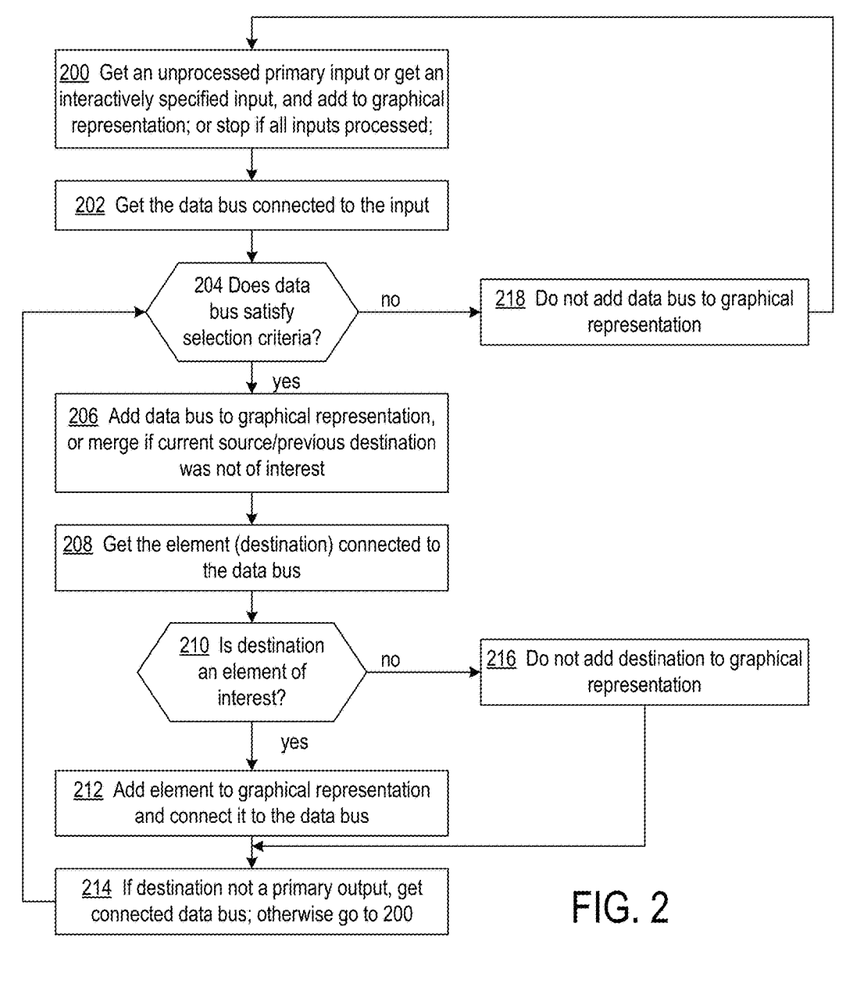
FIG. 2 shows a flowchart of an exemplary process of top-down bus tracking.

FIG. 2 shows a flowchart of an exemplary process of top-down bus tracking. Top-down bus tracking begins at each primary input of the design and proceeds in topological order towards the primary outputs. The tracing proceeds inside hierarchies in order to obtain a hierarchical data flow view of the design.

At block 200, the design tool selects one of the primary inputs that has not been used as a starting point for tracing. Alternatively, the design tool can begin tracing at an input having an identifier that was interactively input by a user. In many instances a user may be interested in viewing the data flow starting from a particular port or instance in a design. The design tool adds a node to the graphical representation to correspond to the selected input. At block 202, the design tool gets the data bus connected to the selected input and begins traversing a path of the circuit design.

At decision block 204, the design tool determines whether or not the data bus satisfies the bus selection criteria. For example, the selection criteria can specify a threshold value indicating a bus bit-width. If the bit-width of the data bus is greater than threshold value, then the data bus satisfies the selection criteria. Otherwise, the data bus does not satisfy the selection criteria.

In response to determining that the bus satisfies the selection criteria, at block 206 the design tool updates the graphical representation of the design flow view by adding an edge that represents the data bus. If the source element is an initial input, i.e., either a primary input or one interactively specified, a node is added to the graphical representation to represent the input, and the edge that represents the bus is connected to the node.

At block 208, the design tool determines from the design specification, the destination element that is connected to the qualifying data bus. At decision block 210, the design tool determines whether or not the destination element is an element of interest by comparing the identifier of the destination element to identifiers recognized by the design tool. The design tool can be programmed with identifiers of elements that are of interest by default. Alternatively, or in combination, identifiers of elements that are of interest can be specified by a user as parameters to the design tool. The identifiers can be entered interactively while operating the design tool or specified in a configuration file. Examples of elements of interest can include a RAM, a digital signal processor, a shift register, a port on an element of interest, etc.

In response to finding that the identifier of the destination element matches one of the identifiers recognized as being of interest, the design tool at block 212 adds a node to the graphical representation to represent the destination element. The node added to the graphical representation is connected to the edge that represents the connected data bus.

At block 214, if the destination element is not a primary output the design tool examines the design specification and retrieves the data bus connected to the output port of the destination element and continues processing at decision block 204. Otherwise, if the destination element is a primary output, the design tool finds another unprocessed primary input (or user specified input) at block 200.

If at decision block 210, the design tool determines that the destination element is not an element of interest, a node is not added to the graphical representation, as shown by block 216, and the design tool continues at block 214. If the destination element is not an element of interest, and the design tool determines at decision block 204 that the data bus connected to the output port of that element satisfies the selection criteria, at block 206 the design tool does not add another edge to the graphical representation for the data bus. Rather, the edge that represents the data bus connected to the input port of the not-of-interest (previous) destination element will represent both that data bus and the data bus connected to the output port of the not-of-interest destination element, effectively merging representations of those two data buses. Thus, a single edge in the graphical representation can represent one or multiple data buses in the circuit design.

In response to finding that a data bus does not satisfy the selection criteria at decision block 204, an edge is not added to the graphical representation, as shown by block 218, and the design tool stops traversing the current path. The design tool returns to block 200 to commence traversal of another path, or stops if all inputs have been processed.

FIG. 3 shows a schematic view of a portion of an exemplary circuit design. The schematic view illustrates more information than may be of interest to a user. The disclosed methods and systems in building a data flow view, extract information of interest from the design specification and discard information not of interest. Data buses that satisfy selection criteria are overlaid on the schematic to illustrate the tracking process. The buses of the design are shown as thin solid lines, and the tracked data buses are shown as thick dashed lines. The elements of interest are assumed to be instances of "RTL_RAM" and "RTL_MULT," in addition to the primary inputs and primary outputs. The selection criteria for data buses is a bit-width of 16 bits. The dashed lines representing the tracked buses are numbered 1-6, which is the order that buses are found to satisfy the selection criteria.

The primary inputs, A and B, are connected to data buses having bit-widths of 16 bits (A[15:0] and B[15:0]). The buses connected to the other primary inputs do not satisfy the selection criteria. Beginning with primary input A, the tracking process adds a node for primary input A and an edge for the bus, which corresponds to dashed line 1, to the graphical representation. The tracking process traces the bus to the destination element, memA_reg, which is an instance of RTL_RAM and is an element of interest. The tracking process adds a node for memA_reg to the graphical representation.

The data bus connected to the output port of memA_reg is 16 bits wide and the tracking process adds an edge to the graphical representation to correspond to dashed line 2. The tracking process traces the bus from the source element memA_reg to the destination element, memA_r_reg[15:0], which is an instance of RTL_REG. Instances of RTL_REG are not of interest, and no node is added to the graphical representation. However, the data bus connected to the output port of memA_r_reg is 16 bits wide and satisfies the selection criteria. Because memA_r_reg is not an element of interest and no node is added, an additional edge is not added to the graphical representation to correspond to the bus connected to the output port of memA_r_reg. Instead, the edge that was added to correspond to the bus from memA_reg to memA_r_reg is extended to represent both the bus from memA_reg to memA_r_reg and the bus connected to the output port of memA_r_reg.

The tracking process traces the bus from memA_r_reg to the destination element memA_t_regO[15:0], which is an instance of RTL_BUF and not an element of interest. Because memA_t_reg is not an element of interest, no node is added. The bus connected to the output port of memA_t_reg is 16 bits wide, and the edge representing the buses from memA_reg to memA_r_reg and from memA_r_reg to memA_t_reg is extended to also represent the bus connected to the output port of memA_t_reg.

The tracking process traces the bus from memA_t_reg to the destination element RTL_MULTO[31:0], which is an instance of RTL_MULT and an element of interest. A node that represents RTL_MULTO is added to the graphical representation and connected to the edge corresponding to the buses of dashed line number 2. The tracking process proceeds as described above in tracing buses to memR_reg, dout_reg[31:0], and the primary output dout_reg[31:0], and adding nodes to represent memR_reg and dout_reg and edges that correspond to dashed lines 3 and 4.

The tracking process begins a new trace at primary input B. In tracing the buses to the primary output dout_reg, the tracking process adds nodes for the primary input B and memB_reg and edges that represent the buses covered by dashed lines 5 and 6. Notably, buses of the circuit design that do not satisfy the selection criteria and elements that are not of interest are excluded from the resulting graphical representation.

FIG. 4 shows an exemplary rendering of the graphical representation generated by the tracking process in tracing paths in the example of FIG. 3. The buses in the resulting data flow view of FIG. 4 correspond to the numbered, dashed lines in FIG. 3. The nodes of the graphical representation represent the identified elements of interest A, memA_reg, RTL_MULT, memR_reg, dout, B, and memB_reg.

Figure 5:
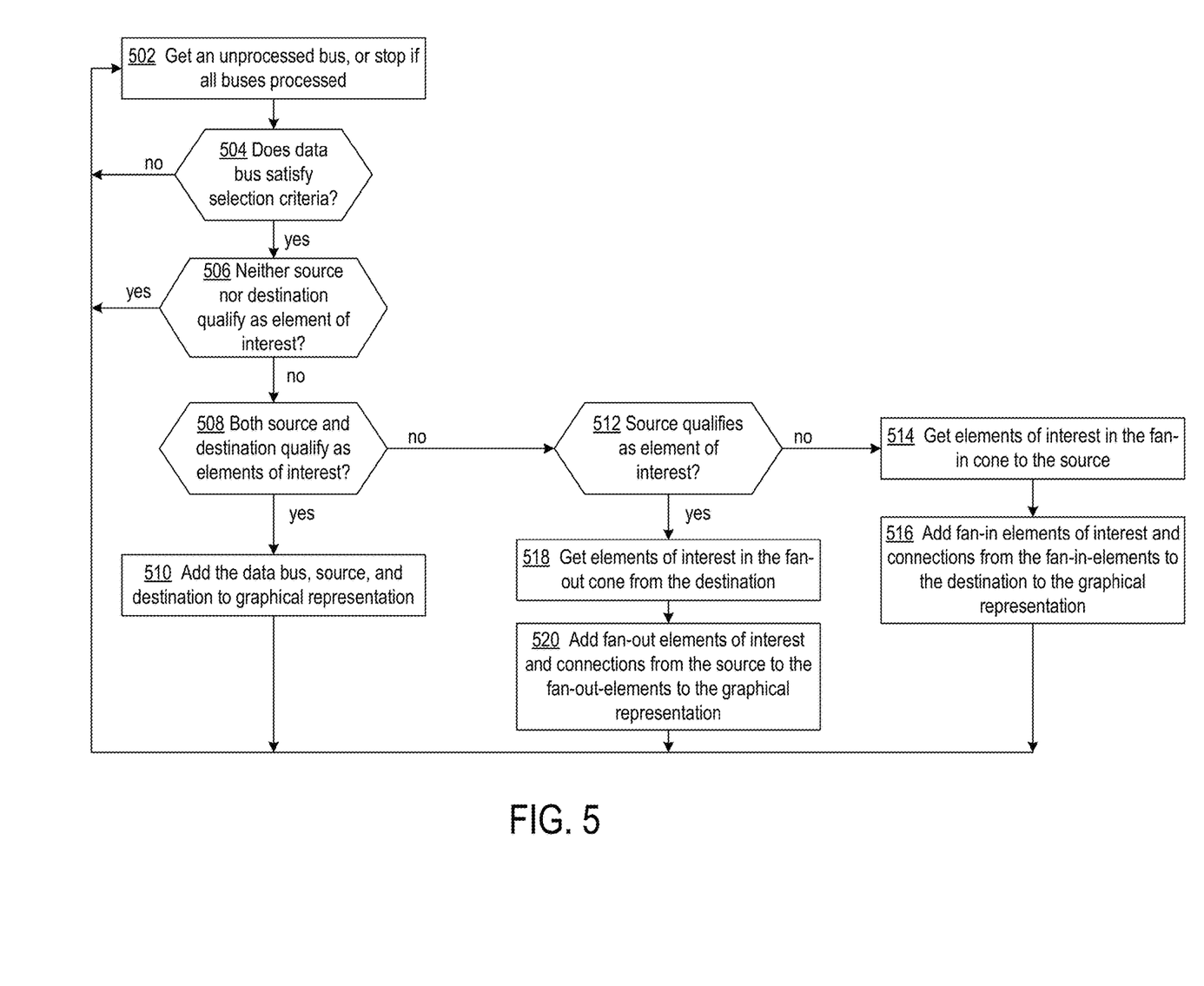
FIG. 5 shows a flowchart of an exemplary process of edge-based bus tracking.

FIG. 5 shows a flowchart of an exemplary process of edge-based bus tracking. Edge-based bus tracking can identify qualifying data buses that top-down bus tracking may miss. Top-down bus tracking is dependent on the ability to track the entire data flow of the design starting from the primary inputs of the design, unless the user manually specifies other inputs. In many real-world examples, the primary inputs may not qualify for the data bus point criterion as bit-widths may be less than the threshold. Furthermore, a data bus may be split into smaller buses on output ports of elements. As a result, tracking of the data bus stops once the bit-width of a bus is less than the threshold.

Edge based bus tracking overcomes the aforementioned shortcomings by considering all buses in the design specification, instead of beginning tracing at an input. In response to finding a bus that satisfies the selection criteria, the edge-based algorithm evaluates the source and destination elements connected to the bus and traverses connections based on whether or not the source and/or destination are elements of interest.

At block 502, the design tool retrieves a bus that has not been evaluated from the design specification. At decision block 504, the design tool determines whether or not the bus satisfies the selection criteria (as previously described). If the bus does not satisfy the selection criteria, the design tool returns to block 502 to process another bus.

Otherwise, at decision block 506 the design tool determines whether or not neither of the source nor the destination qualify as an element of interest. If neither is an element of interest, the design tool returns to block 502 to process another bus. Note that the bus determined to satisfy the selection criteria at decision block 504 will be discovered when another path is traced.

If both or either one of the source or destination is an element of interest, the design tool proceeds to decision block 508. At decision block 508 the design tool determines whether or not both the source and destination elements that are connected to the bus are elements of interest. In response to finding that both the source and destination are elements of interest, the design tool at block 510 adds to the graphical representation nodes that represent the source and destination and an edge connected to the two nodes to represents the bus.

If the both source and destination are not elements of interest, the design tool proceeds from decision block 508 to decision block 512. At decision block 512, the design tool determines whether or not the source is an element of interest. If not (the destination is an element of interest per previous tests), the design tool proceeds to block 514 and determines the elements of interest in the fan-in cone to the source. To obtain the elements of interest in the fan-in cone, the design tool traverses each signal paths to an input port of the source until an element of interest is encountered.

At block 516, the design tool adds to the graphical representation a node for each element of interest in the fan-in cone, a node for the destination element, and an edge that connects the node of each element of interest in the fan-in cone to the node of the destination. The design tool then returns to block 502 to process another unprocessed bus or stop if all buses have been processed.

If the design tool determines at decision block 512 that the source is an element of interest (and the destination is not an element of interest per previous tests), the design tool proceeds to block 518 and determines the elements of interest in the fan-out cone from the destination. To obtain the elements of interest in the fan-out cone, the design tool traverses each signal path from an output port of the destination until an element of interest is encountered.

At block 520, the design tool adds to the graphical representation a node for each element of interest in the fan-out cone, a node for the source element, and an edge that connects the node of each element of interest in the fan-out cone to the node of the source. The design tool then returns to block 502 to process another unprocessed bus or stop if all buses have been processed.

Figure 6:
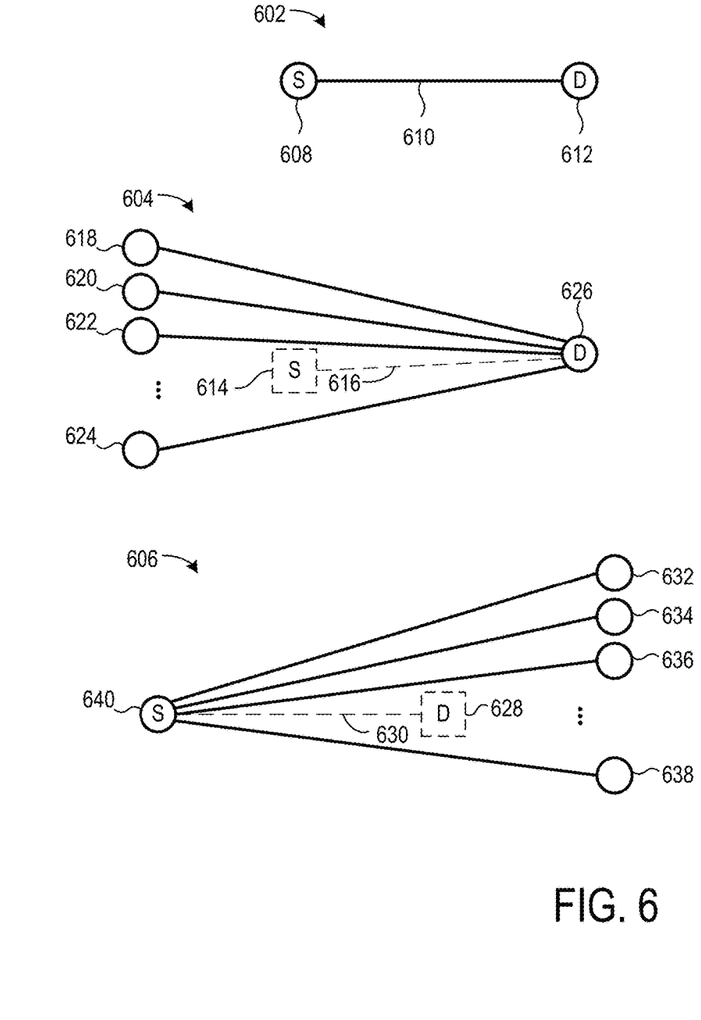
FIG. 6 shows examples of nodes and edges generated for graphical representations of data buses connected between source and destination elements for the three scenarios addressed in the edge-based tracking process of FIG. 5.

FIG. 6 shows examples of nodes and edges generated for graphical representations of data buses connected between source and destination elements for the three scenarios addressed in the edge-based tracking process of FIG. 5. The three scenarios involve a data bus that satisfies selection criteria, and i) both the source and destination elements are of interest, ii) the source is not of interest and the destination is of interest, and iii) the source is of interest and the destination is not of interest. The examples can be sub-graphs of a more complete graphical representation of a circuit design, and the sub-graphs referenced as sub-graph 602, sub-graph 604, and sub-graph 606.

Sub-graph 602 shows an example in which the design tool found a data bus that satisfies selection criteria to be connected between a source element of interest and a destination element of interest. Node 608 represents the source element, node 610 represents the destination element, and edge 612 represents the data bus.

Sub-graph 604 shows an example in which the design tool found a data bus that satisfies selection criteria to be connected between a source element not of interest and a destination element of interest. Because the source element is not of interest, the edge-based tracking finds elements of interest in the fan-in cone of the source and adds nodes and edges for those elements of interest to the graphical representation. Dashed block 614 is not a node and dashed line 616 is not an edge of the sub-graph 604. Dashed block 614 and dashed line 616 are shown to indicate that the source element not of interest is connected by the qualifying data bus to the destination element of interest in the circuit design. Nodes 618, 620, 622, and 624 represent elements of interest found in the fan-in cone to the source element illustrated by dashed block 614. The design tool adds edges that connect those nodes to the node 626 added to represent the destination node of interest.

Sub-graph 606 shows an example in which the design tool found a data bus that satisfies selection criteria to be connected between a source element of interest and a destination element not of interest. Because the destination element is not of interest, the edge-based tracking finds elements of interest in the fan-out cone of the destination and adds nodes and edges for those elements of interest to the graphical representation. Dashed block 628 is not a node and dashed line 630 is not an edge of the sub-graph 606. Dashed block 628 is and dashed line 630 are shown to indicate that the destination element not of interest is connected by the qualifying data bus to the source element of interest in the circuit design. Nodes 632, 634, 636, and 638 represent elements of interest found in the fan-out cone from the destination element illustrated by dashed block 628. The design tool adds edges that connect those nodes to the node 640 added to represent the source node of interest.

Figure 7:
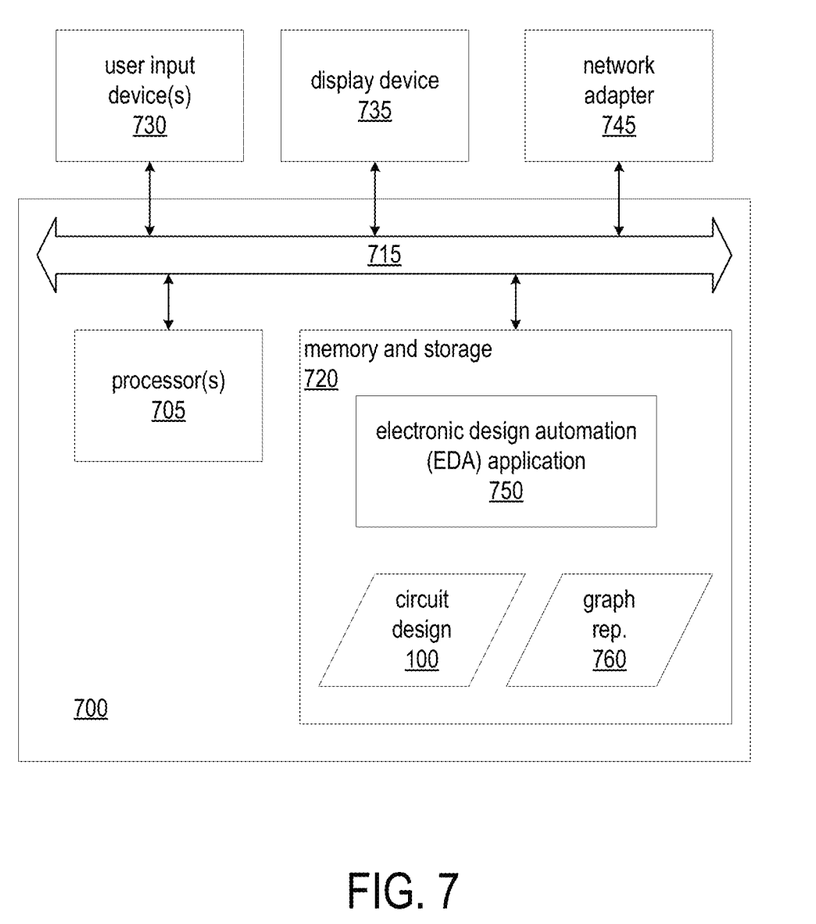
FIG. 7 is a block diagram illustrating an exemplary data processing system.

FIG. 7 is a block diagram illustrating an exemplary data processing system (system) 700. System 700 is an example of an EDA system. As pictured, system 700 includes at least one processor circuit (or "processor"), e.g., a central processing unit (CPU) 705 coupled to memory and storage arrangement 720 through a system bus 715 or other suitable circuitry. System 700 stores program code and circuit design 100 within memory and storage arrangement 720. Processor 705 executes the program code accessed from the memory and storage arrangement 720 via system bus 715. In one aspect, system 700 is implemented as a computer or other data processing system that is suitable for storing and/or executing program code. It should be appreciated, however, that system 700 can be implemented in the form of any system including a processor and memory that is capable of performing the functions described within this disclosure.

Memory and storage arrangement 720 includes one or more physical memory devices such as, for example, a local memory (not shown) and a persistent storage device (not shown). Local memory refers to random access memory or other non-persistent memory device(s) generally used during actual execution of the program code. Persistent storage can be implemented as a hard disk drive (HDD), a solid state drive (SSD), or other persistent data storage device. System 700 may also include one or more cache memories (not shown) that provide temporary storage of at least some program code and data in order to reduce the number of times program code and data must be retrieved from local memory and persistent storage during execution.

Input/output (I/O) devices such as user input device(s) 730 and a display device 735 may be optionally coupled to system 700. The I/O devices may be coupled to system 700 either directly or through intervening I/O controllers. A network adapter 745 also can be coupled to system 700 in order to couple system 700 to other systems, computer systems, remote printers, and/or remote storage devices through intervening private or public networks. Modems, cable modems, Ethernet cards, and wireless transceivers are examples of different types of network adapter 745 that can be used with system 700.

Memory and storage arrangement 720 may store an EDA application 750. EDA application 750, being implemented in the form of executable program code, is executed by processor(s) 705. As such, EDA application 750 is considered part of system 700. System 700, while executing EDA application 750 implements the design tool described herein, receives and operates on circuit design 100. System 700 can perform a design flow on circuit design 100, and the design flow may include synthesis, mapping, placement, routing. The system can also generate a data flow view as described herein. System 700 generates graphical representation of data buses circuit design 100 as graphical representation 760, which can be rendered as a data flow view on display device 735.

EDA application 750, circuit design 100, graphical representation 760, and any data items used, generated, and/or operated upon by EDA application 750 are functional data structures that impart functionality when employed as part of system 700 or when such elements, including derivations and/or modifications thereof, are loaded into an IC such as a programmable IC causing implementation and/or configuration of a circuit design within the programmable IC.

Though aspects and features may in some cases be described in individual figures, it will be appreciated that features from one figure can be combined with features of another figure even though the combination is not explicitly shown or explicitly described as a combination.

The methods and systems are thought to be applicable to a variety of systems for preparing circuit designs. Other aspects and features will be apparent to those skilled in the art from consideration of the specification. The methods and systems may be implemented as one or more processors configured to execute software, as an application specific integrated circuit (ASIC), or as a logic on a programmable logic device. It is intended that the specification and drawings be considered as examples only, with a true scope of the invention being indicated by the following claims.

What is claimed is:

1. A method comprising:
   determining by a computer processor, ones of data buses that satisfy selection criteria in a circuit design having a plurality of data buses that connect elements of the circuit design;
   determining, for each element connected to a data bus of the ones of the data buses, whether the element is of interest or the element is not of interest;
   generating in a memory arrangement, a graphical representation of the ones of the data buses and each element of interest;
   excluding from the graphical representation, data buses of the circuit design determined to not satisfy the selection criteria and elements not of interest; and
   displaying the graphical representation on a display device.

2. The method of claim 1, wherein the selection criteria include a bus bit-width.

3. The method of claim 2, wherein determining the ones of the data buses that satisfy selection includes determining whether or not each data bus of the plurality of data buses has a bit-width greater than a threshold value.

4. The method of claim 1, wherein determining whether the element is of interest or the element is not of interest includes determining that the element is of interest in response to the element being a RAM.

5. The method of claim 1, wherein determining whether the element is of interest or the element is not of interest includes determining that the element is of interest in response to the element being a digital signal processor.

6. The method of claim 1, wherein determining whether the element is of interest or the element is not of interest includes determining whether or not an identifier of the element matches a user-specified identifier of one or more user-specified identifiers.

7. The method of claim 1, wherein:
   determining the ones of the data buses that satisfy the selection criteria includes:
      traversing a path that begins at a selected element of the circuit design and that includes the ones of the data buses that connect elements of the circuit design, and
      stopping the traversing in response to determining that a data bus on the path does not satisfy the selection criteria; and
   generating the graphical representation includes:
      representing each data bus determined to satisfy the selection criteria by an edge in the graphical representation,
      representing a first data bus and a second data bus of the ones of the data buses by a single edge in response to determining that an element that is not of interest is connected between the first data bus and the second data bus, and
      representing each element of interest on the path by a node in the graphical representation.

8. The method of claim 7, wherein the selected element is a primary input port of the circuit design.

9. The method of claim 7, comprising receiving interactively input data that identifies the selected element.

10. The method of claim 1, wherein:
    each data bus of the plurality of data buses connects a source element to a destination element of the elements of the circuit design; and
    generating the graphical representation includes:
       representing each element of interest by a node in the graphical representation, and
       for each data bus determined to satisfy the selection criteria,
          representing the data bus by an edge between nodes of the source and destination elements of the data bus, in response to determining that both the source and destination elements are elements of interest,
          representing the data bus by one or more edges from one or more nodes representing one or more elements of interest in a fan-in cone of the source element of the data bus, in response to determining that the destination element of the data bus is an element of interest and that the source element of the data bus is not an element of interest, and
          representing the data bus by one or more edges from one or more nodes representing one or more elements of interest in a fan-out cone of the destination element of the data bus, in response to determining that the destination element is not an element of interest and that the source element of the data bus is an element of interest.

11. A system comprising:
    one or more computer processors configured to execute program code; and
    a memory arrangement coupled to the one or more computer processors, wherein the memory arrangement is configured with instructions that when executed by the one or more computer processors cause the one or more computer processors to perform operations including:

determining from a circuit design having a plurality of data buses that connect elements of the circuit design, ones of the data buses that satisfy selection criteria;

determining, for each element connected to a data bus of the ones of the data buses, whether the element is of interest or the element is not of interest;

generating a graphical representation of the ones of the data buses and each element of interest;

excluding from the graphical representation, data buses of the circuit design determined to not satisfy the selection criteria and elements not of interest; and displaying the graphical representation on a display device.

12. The system of claim 11, wherein the selection criteria include a bus bit-width.

13. The system of claim 12, wherein the instructions for determining the ones of the data buses that satisfy selection include instructions for determining whether or not each data bus of the plurality of data buses has a bit-width greater than a threshold value.

14. The system of claim 11, wherein the instructions for determining whether the element is of interest or the element is not of interest include instructions for determining that the element is of interest in response to the element being a RAM.

15. The system of claim 11, wherein the instructions for determining whether the element is of interest or the element is not of interest include instructions for determining that the element is of interest in response to the element being a digital signal processor.

16. The system of claim 11, wherein the instructions for determining whether the element is of interest or the element is not of interest include instructions for determining whether or not an identifier of the element matches a user-specified identifier of one or more user-specified identifiers.

17. The system of claim 11, wherein:
the instructions for determining the ones of the data buses that satisfy the selection criteria include:
instructions for traversing a path that begins at a selected element of the circuit design and that includes the ones of the data buses that connect elements of the circuit design, and
instructions for stopping the traversing in response to determining that a data bus on the path does not satisfy the selection criteria; and the instructions for generating the graphical representation includes:
instructions for representing each data bus determined to satisfy the selection criteria by an edge in the graphical representation,
instructions for representing a first data bus and a second data bus of the ones of the data buses by a single edge in response to determining that an element that is not of interest is connected between the first data bus and the second data bus, and
instructions for representing each element of interest on the path by a node in the graphical representation.

18. The system of claim 17, wherein the selected element is a primary input port of the circuit design.

19. The system of claim 17, the memory arrangement is further configured with instructions that when executed by the one or more computer processors cause the one or more computer processors to interactively receive input data that identifies the selected element.

20. The system of claim 11, wherein:
each data bus of the plurality of data buses connects a source element to a destination element of the elements of the circuit design; and
the instructions for generating the graphical representation include instructions for:
representing each element of interest by a node in the graphical representation, and
for each data bus determined to satisfy the selection criteria,
representing the data bus by an edge between nodes of the source and destination elements of the data bus, in response to determining that both the source and destination elements are elements of interest,
representing the data bus by one or more edges from one or more nodes representing one or more elements of interest in a fan-in cone of the source element of the data bus, in response to determining that the destination element of the data bus is an element of interest and that the source element of the data bus is not an element of interest, and
representing the data bus by one or more edges from one or more nodes representing one or more elements of interest in a fan-out cone of the destination element of the data bus, in response to determining that the destination element is not an element of interest and that the source element of the data bus is an element of interest.

* * * * *